Nov. 1, 1966 R. C. BENTON 3,282,049
DIGITAL HYDRAULIC POSITIONING DEVICE
Filed Feb. 15, 1965 2 Sheets-Sheet 1
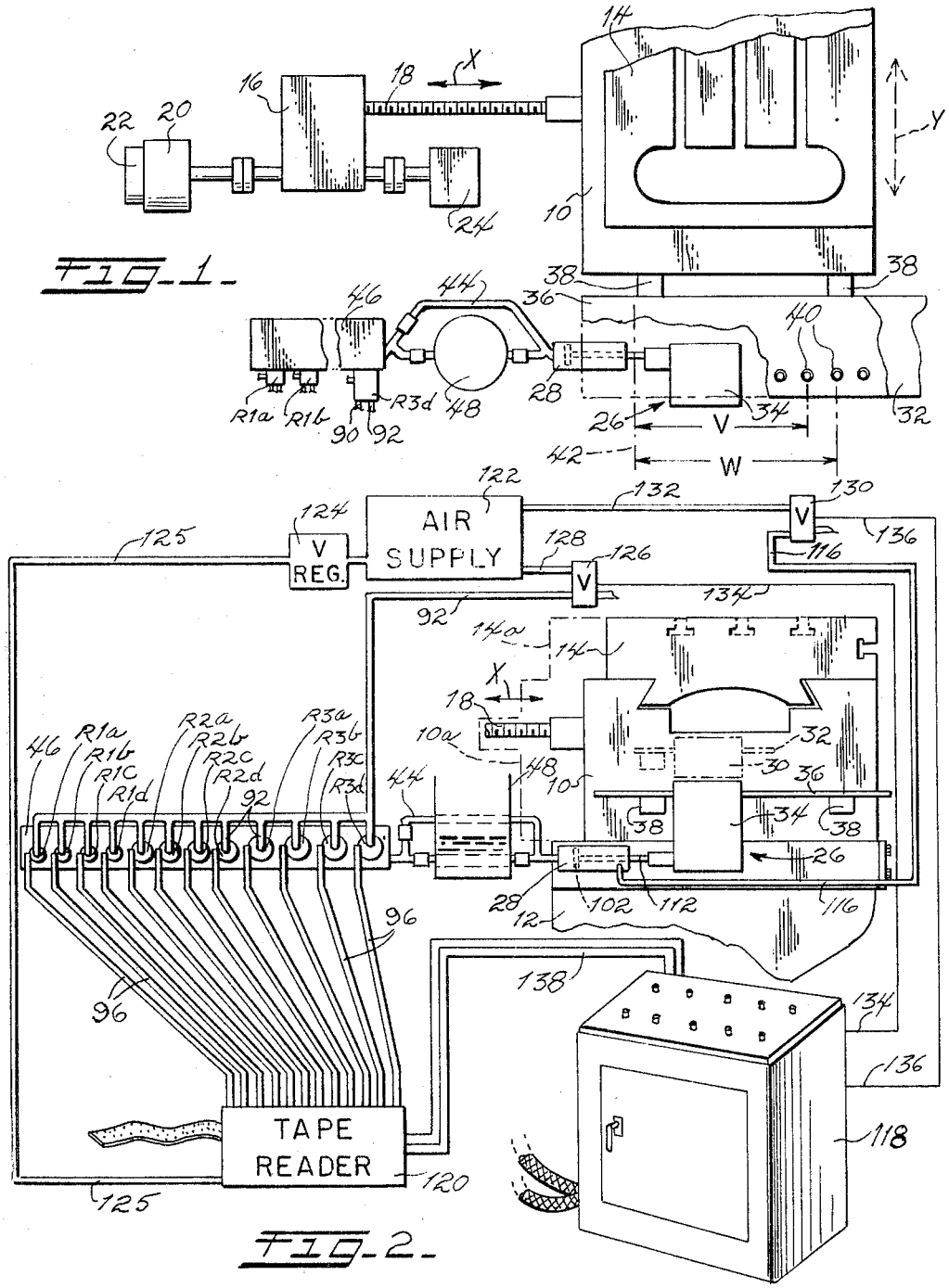
INVENTOR
ROBERT C. BENTON
BY John W. Gaines
ATT'Y Nov. 1, 1966  R. C. BENTON  3,282,049
DIGITAL HYDRAULIC POSITIONING DEVICE
Filed Feb. 15, 1965  2 Sheets-Sheet 2
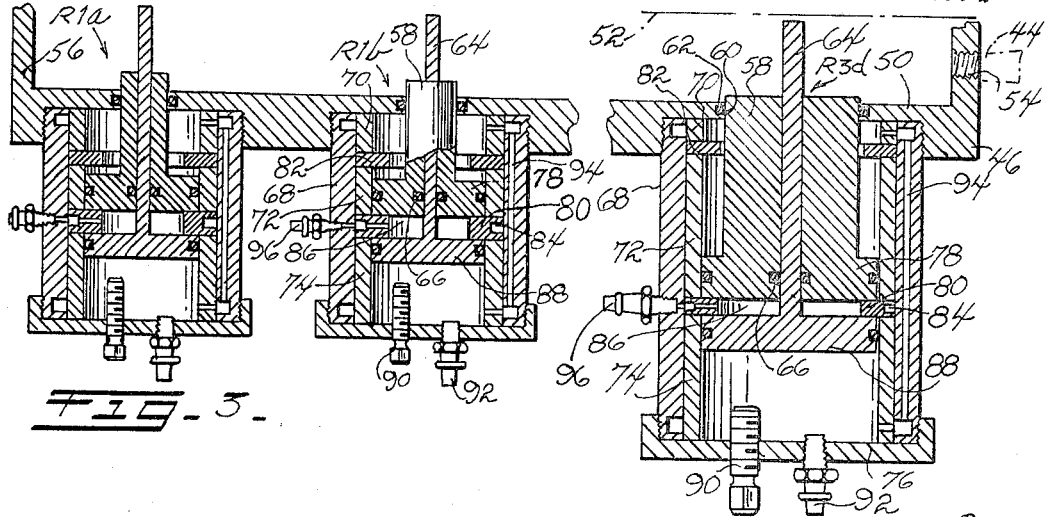
INVENTOR
ROBERT C. BENTON
BY John W. Haines
ATT'Y United States Patent Office 3,282,049
Patented Nov. 1, 1966

1

3,282,049
DIGITAL HYDRAULIC POSITIONING DEVICE
Robert C. Benton, State College, Pa., assignor to Chemcut Corporation, a corporation of Pennsylvania
Filed Feb. 15, 1965, Ser. No. 432,499
16 Claims. (Cl. 60—52)

This application relates to an hydraulic postioning device for use with point-to-point positioning means in an automatic machine tool, and is particularly concerned with such a device for hydraulically positioning a sensing element in accordance with a digitally coded signal so as to precisely control the workpiece carrying means in the machine tool.

Digital hydraulics have been proposed as a means of control over a slave cylinder, in order to move a machine tool element accurately to a desired point. Attempts have been made with circulating hydraulic systems which provide parallel fluid flow conduits carrying metered streams of the fluid, each proportional to an analog fluid signal; the difficulty is that either expensive sensitive proportional flow valves or else a great number of valves is needed for the requisite accuracy and rapid response. Also, attempts have been made using a plurality of free-piston, glob cylinders, each cylinder being separate and of a different size from the others so that when the volume of each is fed at times in the right rotation by a distributing valve to the slave cylinder, the latter cylinder responds each time by progressively moving a proportionate amount. The great number of precision cylinders and of distributing valves that is needed creates a difficulty. Other difficulties are that calibration of the cylinders to the right relative proportions gives cause for error, and failure to keep at all times a constant volume of liquid in the system gives rise to error.

An object of my invention is to provide a digital hydraulic positioning device which requires neither expensive proportional valves, nor a great number of valves of any type, nor a great number of hydraulic cylinders.

Another object is the provision of a digital hydraulic positioning device which insures constant volume of the fluid in the system.

Another object of my invention is to provide pluralities of liquid displacing rams arranged in sets, and an elongated manifold which receives the pluralities of rams through sets of side ports in the manifold thus centrally consolidating their displacements as one combined output, and which in that fashion is common to all rams in providing the hydraulic drive to a driven piston. The ram seals are relatively simple, easy to maintain, and liquid tight, and the need for pluralities of individual hydraulic cylinders and pistons to provide the displacement is avoided.

A specific object of the invention, particularly in connection with the use thereof in the environment of a machine tool having workpiece carrying means, and having automatic means controlled by the position of a driven piston for controlling point-to-point locations into which the workpiece is carried by the carrying means, is the provision of: a driven piston which on the drive stroke is to be displaced to a precise one of a plurality of positions therefrom and then restored on the return stroke; a control assembly to control movement of the piston including a number of individually extensibly and retractively movable rams; a ported hydraulic manifold provided with a like number of side ports for the rams; the manifold

2 having a main central chamber which is common to the rams and which is generally cylindrically elongated in the direction of the longitudinal axis of the manifold; the rams each being slidably received in and projecting inwardly through the plane of the receiving port to a point of adjacency to one another within, and free from contact with the interior of, the generally cylindrical common chamber in the hydraulic manifold; means for activating selected ones of said rams to cause displacement of liquid in the common hydraulic manifold in amount equal to the combined output displaced by the activated rams; means comprising a one-way valve in the output of the manifold providing a one-way hydraulic drive column from the rams and communicatively connected with an input providing input liquid flow to one side of the driven piston; and preloadably biased, one-way means communicatively connecting said one side of the driven piston to drain for providing a one-way disposal of the hydraulic drive liquid upon the return stroke of the piston.

Further features, objects, and advantages will either be specifically pointed out or become apparent when, for a better understanding of the invention, reference is made to the following written description taken in conjunction with the accompanying drawings which show a preferred embodiment thereof, and in which:

FIGURE 1 is a top plan view of an automatically positioned machine tool equipped with a digital hydraulic positioning device embodying the present invention;

FIGURE 2 is a side elevational view of the machine tool, and its control system which is schematically represented;

FIGURE 3 is a fragmentary showing, sectionalized and to an enlarged scale, of a detail of and corresponding to FIGURE 1;

FIGURE 4 is a showing like FIGURE 3, both figures illustrating the ram and cylinder construction and operation, but each illustrating a different stroke of the rams; and FIGURE 5 is a fragmentary showing, sectionalized and to enlarged scale, of a detail of and corresponding to FIGURE 2.

More particularly in FIGURES 1 and 2 of the drawings, the machine tool selected for purposes of illustration is a milling machine. The table structure thereof as shown includes a saddle 10 which is supported on a knee 12 for movement in the X direction as indicated by a double headed, solid line arrow, and which supports a workpiece carrying table 14 for independent movement of the table in the Y direction.

A dual input gear drive 16 mechanically rotates a conventional lead screw connection 18 to move the saddle 10 and the table 14 thereon toward and from their zero reference position shown by the respective dotted lines 10a and 14a. An inch motor 20 equipped with an electric brake 22 is coupled to one of the input shafts of the dual input gear drive 16 and a decimal increment motor 24 is coupled to the other input shaft of the gear drive 16.

A table control and stopping mechanism indicated by the general reference numeral 26 is connected to an hydraulic positioning device 28 and is mounted on guides on the knee 12 for constrained movement on the knee into positions controlled by the device 28. The table control and stopping mechanism 26 includes a large increment positioner 30 which sensitively straddles a long strip 32 carried by the saddle 10 in a way enabling the saddle and table to move conjointly to a selected inch point, for example, to the twelve inch reference mark. When it senses that mark on the strip 32, the positioner 30 interrupts the joint operation of the inch motor 20 and the decimal increment motor 24. More specifically, the large increment positioner 30 deenergizes the inch motor 20 and locks it with the brake 22, and a take-over circuit is activated thereby, causing a small increment positioner 34 to assume control over and continue operation of the decimal increment motor 24.

The small increment positioner 34 forms no per se part of the present invention. It can be of the type generally as shown in my copending U.S. Patent No. 3,184,599.

Briefly, the small increment positioner 34 comprises a photocell head which sensitively straddles a narrow plastic strip 36 carried in a horizonal position by means of spaced apart brackets 38 on the saddle 10. The strip 36 carries a row of upstanding light guide tubes 40 which are located in consecutive multiples of a whole unit away from a zero reference line 42 on the strip 36.

In the illustrated embodiment of the invention wherein the chosen unit was one inch, one tube 40 was a distance V away from the reference line 42, say eight inches. The next tube was one unit farther away so that the distance W was nine inches. Beginning at the instant at which the photocell head of the small increment positioner 34 is activated, it operates on a null sensing principle between photocells to bring the saddle 10 to a stop so that the head is precisely in registry with that tube 40 which is nearest to the selected reference mark.

The positioning device 28 is displaced on a pumping principle, and is actuated by the column of liquid in a one-way hydraulic drive line 44 connected in the output of a ram and cylinder type manifold 46. The system is kept fully charged from a reservoir 48.

The rams, not shown in FIGURES 1 and 2, which are employed with the manifold 46 are double acting rams and are operated by three sets of ram actuators, the first set comprising ram actuators R1a, R1b, R1c, and R1d, the second set comprising ram actuators R2a, R2b, R2c, and R2d, and the third set comprising ram actuators R3a, R3b, R3c, and R3d, respectively.

In FIGURE 3, the cylinder-like manifold 46 illustrated has a main central chamber 50 which is generally cylindrically elongated in the direction of the longitudinal axis 52 of the manifold. An inlet-outlet port 54 connected to the hydraulic drive line 44 is formed in a first transverse end wall of the manifold 46, and the opposite transverse end wall 56 is completely closed off. The sets of ram actuators and the rams are graded in size as between sets and also, within each set, the ram actuators and rams are graded in size for reasons later to be explained. However, their general structure and operation are the same and the large ram actuator R3d of the third set will now be described.

The ram actuator R3d as shown in FIGURE 3 carries a pair of ram members including a hollow ram 58 which is extensibly and retractively slidable within and through the plane of a circular side port 60 in the wall of the manifold 46. An O-ring forms a seal 62 between the ram 58 and the circular bore of the port 60. A small extensibly and retractively slidable rod or ram 64 constitutes the other member of the pair, extending through the hollow of the ram 58 and being sealed thereto by means of an O-ring seal 66. The rams of the pair at their inner end are adjacent the inner ends of the other rams, and all are commonly within, and free from contact with the interior of, the generally cylindrical common chamber 50 in the manifold 46.

A cylinder assembly comprising an outer cylinder 68 and three coaxial inner cylinders 70, 72, and 74 is threaded at the inner end into a socket in the manifold 46 and is closed by a removable, air tight cover 76 at the outer end. An air-operated piston 78 integral with the hollow ram 58 drives it with double action, reciprocating it between a grooved stop ring 80 and an inner stop ring 82.

The grooved stop ring 80 has an outside groove 84 which communicates, through a radially inwardly extending passage in the ring, with a space 86 between the adjacent ends of the piston 78 and another air-operated piston 88 which is integral with the small ram 64. The piston 88 slides in the cylinder assembly between the grooved stop 80 and an adjustable outer stop 90 comprising a square-headed bolt threaded through the cover 76.

A ram resetting air conduit 92 is connected through the cover 76 with the interior of the cylinder assembly. Communication is established between the respective outer ends of the pistons 78 and 88 by means of a longitudinally drilled passage 94 in the wall of the outer cylinder 68, which passage communicates through inside grooves in the cylinder 68 with side holes through the walls of the respective cylinders 70 and 74. A ram actuating air conduit 96 leads through a side hole in the wall of the outer cylinder 68 so as to communicate with the space 86 between pistons by means of the outside groove 84 and the radially inwardly extending passage in the stop ring 80.

The two ram actuators R1a and R1b shown in FIGURE 3 are in the first set of actuators. These actuators are smaller than the actuator R3d, and both the cross sectional area of the rams and their stroke are materially smaller than their counterparts in the ram actuator R3d.

In FIGURE 4, the ram actuators R1a, R1b, R3d are each one shown in the actuated position wherein the ram 58, for example, is extended and the small ram 64, which is a countermoving ram, is retracted. Conversely when the pair of rams 58 and 64, or the rams of the other pairs are reset, the ram 58 takes a retracted position as shown in FIGURE 3 and the ram 64 is extended. The pairs of rams are rarely if ever actuated together. In practice, only selected ones are actuated and the unselected ones remain unmoved in their reset position.

The selected rams cause displacement of liquid from the manifold 46 in an output flow path which, as seen in FIGURE 5, leads through the inlet-outlet port 54, a fitting 44a at one end of the hydraulic drive line 44, an adjacent one-way check valve 98 in the line 44, thence continues in the remainder of the line 44, and finally through a long extension 44b thereof which provides the input and is connected to an inlet-outlet port 100 in the head end of the hydraulic positioning device 28.

The positioning device 28 is an hydraulic cylinder in which a driven piston 102 slides. During the positioning stroke of the piston 102, fluid pressure introduced in the head of the cylinder is applied to the adjacent first side of the piston which moves to the right as viewed in FIGURE 5, and the liquid column in the line 44 opens, and flows through, the check valve 98, which prevents reversal of flow. During the resetting stroke of the piston 102, trapped liquid at the first side thereof is forced to open a ball valve 104 which is preloaded on its seat by a spring 106 and which provides a one-way disposal of the hydraulic drive liquid to the reservoir 48. Simultaneously with the resetting stroke of the piston 102, the ram actuators undergo a resetting stroke causing the liquid to be replenished in the manifold 46 in a suction flow path including the reservoir 48, a suction line 108 containing a one-way check valve 110, the fitting 44a, and the inlet-outlet port 54 through the first transverse end wall of the manifold 46.

The piston 102 at the rod side thereof has a piston rod 112 connecting it to the photocell head of the small increment positioner 34. A piston loading spring 114 is carried in an air chamber on the rod side of the piston 102 and the air chamber is supplied through a resetting conduit 116. Suitable piston stops are illustrated in the respective head and rod ends of the device 28, and in practice they can be made adjustable stops if desired. The piston rod 112 is threaded where it connects to the positioner 34 for adjusting the zero reference point to the right starting place for the photocell head.

In a numerical example, the length of travel of the piston 102 is in the range between 0.000 inch and 0.999 inch, in 0.001 inch increments. Thus, the photocell head of the small increment positioner 34 is moved any distance S away from a zero reference point O to a maximum of 0.999 inch. Simply for purposes of this numerical example, let it be assumed that the piston 102 has a cross sectional area of one square inch.

Following are illustrative net displacements of the pairs of rams when actuated, in terms of cubic inches of liquid displaced:

| | |
|---|---|
| R1a | 0.001 |
| R1b | 0.002 |
| R1c | 0.004 |
| R1d | 0.008 |
| R2a | 0.010 |
| R2b | 0.020 |
| R2c | 0.040 |
| R2d | 0.080 |
| R3a | 0.100 |
| R3b | 0.200 |
| R3c | 0.400 |
| R3d | 0.800 |

From the foregoing, it is apparent that actuation of the ram actuators R1a, R2a, and R3a only, displaces 0.111 cubic inch of liquid causing the piston 102, FIGURE 5, to move the photocell head through a distance S of 0.111 inch. All decimal points are covered in the range, and activation of the ram actuators R1b, R1c, R2a, R2b, R3a, and R3d, for example, causes displacement of the photocell head to the point at which the distance S equal 0.936 inch.

In the overall apparatus as seen in FIGURE 2 of the drawings, a sequencing console 118 cyclically operates a tape reader 120 so as to advance and take a new digital code reading on a perforated input member such as a punched tape. The tape can contain eight channels of information, preferably in binary code, and the output signals which the reader emits into the ram actuating conduits 96 are on-off binary air signals. Air is supplied to the tape reader from a compressed air supply 122, the output of which is controlled by a regulating valve 124 so as to keep down the pressure and prevent damaging the tape, which is sometimes fragile.

The binary air signals are directed to selected ram actuators and the acivated rams, through their combined output in the manifold 46, hydraulically drive the piston 102 to the right as viewed in FIGURE 2. The ram resetting air conduit 92 is vented to atmosphere by a deenergized solenoid valve 126 which simultaneously is blocking an outlet 128 from the air supply 122. The piston resetting air conduit 116 is vented to atmosphere by a deenergized solenoid valve 130 which at the same time blocks a conduit 132 connected to the air supply 122.

The sequencing console 118 and the tape reader 120 meantime are also operating, in order, the large increment positioning device 30 and then the small increment positioning device 34 so that the latter precisely registers with the light guide tube 40 which has been preselected on the passing strip 36.

A work operation is then performed upon a workpiece on the carrying table 14, it being appreciated that the table 14 has meantime been positioned in the Y direction by similar large and small increment positioners, not shown.

The sequencing console 118 causes the tape reader 120 to advance the tape for the next reading, and meantime the console has performed several other functions. Current from the console 118 is caused to flow in two wires 134 and 136 which energize and open the respective solenoid valves 126 and 130. High pressure air from the respective conduits 128 and 132 leading from the air supply 122, is fed through the energized valves 126 and 130, respectively, pressurizing the conduits 92 and 116 and simultaneously resetting the rams and resetting the piston of the positioning device 28 to its zero reference position.

Through a control cable 138 between the console 118 and the tape reader 120, the tape is caused to stop moving in the tape reader 120 when the tape reader reaches the next reading, and the cycle is then repeated.

As herein disclosed, the invention is shown embodied in a greatly simplified and yet highly accurate apparatus. The ram devices act as pumps or transmitters on their activated strokes and the driven piston device 102 acts as a pump or transmitter on its resetting stroke, the devices thus continually alternating in adding fluid in one direction at one end of the system, and in eliminating fluid at the other end of the system. The purpose of preloading the valve 104 is to prevent escape of the hydraulic drive liquid column in line 44 when advancing the piston 102 against its comparatively light, return or loading spring 114. The other valves in the hydraulic circuit can be simple check valves.

The extension conduit 44b, FIGURE 5, allows the bulk of the hydraulic system to be spaced from the machine tool itself by any desired distance, the advantage being isolation of everything but device 28 from the heat of the tool, from the vibration of the tool, and from the free access of the operator to the tool. The volumetric capacity of the reservoir 48 allows the hydraulic liquid to remain reasonably cool and to have substantially uniform viscosity through successive operating shifts.

I have provided a special ram and cylinder arrangement to which such expressions as "generally cylindrical" and "cylinder like" are herein applied to the common cylinder or manifold chamber. These expressions are obviously used in the broad sense, being intended to embrace equivalent noncylindrical chambers having cross sections of closed geometrical figures such as elliptical, rectangular, or square sections, and having either a uniform cross section from end to end, or a tapering cross section therebetween or, more in general, a non-uniform cross section from end to end.

It is appreciated that the countermoving small rams 64 have an off-setting effect, though slight, on the displacement effort of the large rams 58. Because of their comparatively long stroke and small diameter and displacement, the small rams 64 afford a highly accurate means of adjustment so that the net displacement of each pair of rams can be accurately calibrated for the displacement desired.

Variations within the spirit and scope of the invention described are equally comprehended by the foregoing description.

What is claimed is:

1. In a machine tool having workpiece carrying means, and automatic means controlled by the position of a driven piston for controlling point-to-point locations into which the workpiece is carried by the carrying means:
   a driven piston which on the drive stroke is displaced from an initial starting position to a selected position therefrom and then restored on the return stroke;
   a control assembly to control movement of the piston including a number of individually extensibly and retractively movable rams;
   a ported hydraulic manifold for the number of rams and provided with a like number of side ports slidably receiving the rams, said manifold having a main central chamber which is common to the rams, and which is generally cylindrically elongated in the direction of the longitudinal axis of the manifold;
   said rams each projecting inwardly through the plane of the receiving port to a point of adjacency to one another within, and free from contact with the interior of, their common chamber in the hydraulic manifold;
   means for activating selected ones of said rams to cause displacement of liquid in said common hydraulic manifold which combines the output displaced by the activated rams; and means in the output of said manifold providing at times a one way hydraulic drive column flowing from said rams and communicatively connected with an input to the driven piston providing input liquid flow to one side thereof; and interconnecting means including a reservoir and providing at other times a one way return flow from the piston to the rams, via the reservoir.

2. In a machine tool having workpiece carrying means, and automatic means controlled by the position of a driven piston for controlling point-to-point locations into which the workpiece is carried by the carrying means:

a driven piston which on the drive stroke is displaced from an initial starting position to a selected one of a plurality of positions therefrom and then restored on the resetting stroke;

a control assembly to control movement of the driven piston including a number of individually extensibly and retractively movable ram means arranged in sets;

a ported hydraulic manifold provided with a like number of side ports slidably receiving the number of ram means and arranged in like sets, said manifold having a chamber common to the ram means and being generally cylindrically elongated in the direction of the longitudinal axis of the manifold;

the ram means projecting inwardly through the plane of the associated receiving ports to a point of adjacency to one another within, and free from contact with the interior of, their common chamber in the hydraulic manifold;

means for activating selected ram means to cause displacement of liquid in said common hydraulic manifold which combines the output displaced by the activated ram means;

means in the output of said manifold providing a one way hydraulic drive column from said ram means communicatively connected with an input to the driven piston providing input liquid flow to one side of the piston; and preloadably biased means communicatively connecting said one side of the driven piston to drain, for providing one way disposal of the hydraulic drive liquid upon resetting of the driven piston.

3. The invention of claim 2, there being more than two sets of ram means, of which the ram means of each set comprise four ram means, and in at least a majority of which sets, the liquid displacement caused by the respective ram means of each set varies in the volumetric ratio of 1, 2, 4, and 8.

4. The invention of claim 3, each ram means of a set causing a displacement of the driven piston reading to a common decimal place of movement, which is a different decimal place from the decimal places of the displacements caused by the ram means of the other sets, but aggregating with those other sets a total figure reading to the same number of decimal places as the number of the sets of ram means.

5. The invention of claim 2, including means in a suction line to the ram means and connected to the manifold so as to provide one-way suction from drain into the manifold, completing a constant volume circuit wherein the one-way hydraulic drive column from the manifold goes directly to the driven piston, and the disposal liquid from the piston goes indirectly to the suction of the manifold.

6. The invention of claim 2, including a reservoir serving as the drain into which said preloadably biased means provides one-way disposal of liquid from the driven piston upon its resetting stroke; and means in a suction line to the ram means communicatively connected to the reservoir and providing therefrom a one-way suction into the manifold, completing a closed loop circuit wherein all of the one-way hydraulic drive column from the manifold is constrained to go directly to the driven piston, all disposal liquid is always constrained to go directly to the reservoir, and all suction liquid of the manifold is always constrained to come from the reservoir.

7. The invention of claim 2, including a first inlet-outlet port in said manifold to which the one-way hydraulic drive means is connected;

a cylinder in which the driven piston slides;

a second inlet-outlet port in said cylinder communicating with said one side of the piston and being common to the one-way hydraulic drive means and to the preloadably biased means connecting said one side of the piston to drain; and a reservoir serving as the drain, said manifold having a suction line connected from the manifold inlet-outlet port to the reservoir and providing a one-way transfer of liquid from the reservoir into the manifold, completing a circuit wherein all suction liquid is admitted into the manifold inlet-outlet port only from the reservoir, wherein hydraulic drive liquid is emitted from the manifold inlet-outlet port only to the cylinder inlet-outlet port, and disposal liquid is emitted from the cylinder inlet-outlet port only to the reservoir, thereby keeping the liquid circulating in a loop with constant volume within the manifold, in the hydraulic drive column between the first and the second inlet-outlet ports, and on the one side of the piston, collectively.

8. The invention of claim 2, each ram means comprising a pair of rams consisting of a first ram and, by comparison, a very small volume ram, disposed one within another and with at least one ram being hollow, the first ram having a fixed stroke and the very small volume ram having an adjustable stroke enabling trimming of their combined displacement to a fine degree of adjustment.

9. The invention of claim 2, the sets of ram means consisting of pluralities of pairs of rams, each pair of which including companion countermoving rams of differing displacement volumes, one ram having a fixed stroke, the countermoving companion ram being a very small volume ram and having an adjustable stroke enabling trimming of their combined displacement to a fine degree of adjustment.

10. In a machine tool having a driven piston for controlling point-to-point locations into which a workpiece is carried in accordance with digital code:

the combination comprising a driven piston which on the activated stroke is displaced from an initial starting position to a selected position therefrom and then restored on the resetting stroke;

a control assembly to control movement of the piston including plural, individually activatingly and resettingly moving ram means;

a ram receiving, ported hydraulic cylinder slidably receiving the ram means, and having a single chamber common to the ram means and elongated in the direction of the longitudinal axis of the cylinder;

said ram means projecting at their inner end through the plane of a port to a point of adjacency to one another within, and free of contact with the interior of, the single common chamber in the hydraulic cylinder;

each ram means comprising a pair of companion, countermoving rams which are different in cross sectional area, said rams being provided with separate fluid operated pistons which are connected thereto and which have relatively adjacent and relatively outer spaced positions with respect to one another;

means for applying fluid pressure to the adjacent ends of the fluid operated pistons of selected ram means for activatingly moving the latter to cause displacement of liquid in said common hydraulic manifold which combines the output displaced by the activated ram means;

means in the output of said cylinder providing a one-way hydraulic drive column from said ram means and communicatively connected with an input providing activating input liquid flow to one side of the driven piston;

means for applying fluid pressure to the outer ends of the fluid operated pistons of the selected ram means and to the other end of said driven piston for resetting the rams and resetting the driven piston; and reservoir means having a one-way connection leading from the driven piston and a one-way connection directed to the cylinder for providing substantially simultaneously for one-way disposal of the hydraulic drive liquid from the driven piston and one-way replenishment of liquid into the cylinder upon conjoint resetting of the ram means and the driven piston.

11. In a machine tool having a driven piston in a control for controlling point-to-point locations into which a workpiece is carried in accordance with a digital code:

the combination of a driven piston which on the input stroke is displaced from an initial starting position to a selected position therefrom, and then restored on the resetting stroke;

a control assembly to control movement of the piston including plural, individually extensibly and resettingly moving ram means;

a ram receiving, ported hydraulic cylinder slidably receiving the ram means, and having a single chamber common to the ram means and being elongated in the direction of the longitudinal axis of the cylinder;

said ram means being transversely disposed and projecting at their inner end through the plane of a receiving port to a point of adjacency to one another within, and free of contact with the interior of, the single common chamber in the hydraulic cylinder;

each ram means comprising a pair of companion, countermoving rams which are different in cross sectional area, said rams provided with separate fluid operated pistons which are connected thereto and which have relatively adjacent and relatively outer spaced positions with respect to one another;

signal-emitting binary tape reader mechanism providing output pressure signals corresponding to said digital code and applying the pressure to adjacent ends of the fluid operated pistons of selected ram means, for extensibly moving same to cause displacement of liquid in said single hydraulic chamber which combines the output displaced by the selected ram means;

means in the output of said cylinder providing a one-way hydraulic drive column from said ram means and communicatively connected with an input providing input liquid flow to one side of the driven piston;

means for applying higher fluid pressure to the outer ends of the fluid operated pistons and to the other side of said driven piston for resetting the ram means and resetting the driven piston; and a reservoir having a one-way connection leading from the driven piston and a one-way connection directed to the cylinder for providing substantially simultaneously for one-way disposal of the hydraulic drive liquid from the driven piston and one-way replenishment of liquid into the cylinder upon conjoint resetting of the ram means and the driven piston.

12. In means for hydraulically driving a piston which accurately positions a machine tool control element, said piston having an input to receive input liquid flow against one side of the piston to displace same:

an improved ram and cylinder mechanism comprising a number of individually extensibly and withdrawably moving ram means; and an hydraulic cylinder with a like number of ports intersecting the interior and slidably receiving the ram means, said interior comprising a liquid chamber common to the ram means and being generally elongated in the direction of the longitudinal axis of the cylinder;

said ram means projecting at the inner end through the plane of the receiving port to a point of adjacency to one another within, and free from contact with the interior of, the generally elongated, common liquid chamber in the hydraulic cylinder;

said ram means when extended causing displacement of liquid from the cylinder which combines the ram output for providing the input liquid flow to said side of the piston to displace same;

said ram means consisting of pairs of companion, countermoving rams, the rams of each pair of which are different in cross sectional area, one ram of each pair having a fixed stroke, and the companion countermoving ram being smaller and having an adjustable stroke enabling their combined displacement to be trimmed to a fine degree of adjustment.

13. In means for hydraulically driving a piston which accurately positions a machine tool control element, said piston having an input to receive input liquid flow against one side of the piston to displace same:

an improved ram and cylinder mechanism comprising individually extensibly and retractively moving ram means; and an hydraulic cylinder with ports intersecting the interior and slidably receiving the ram means, said interior comprising a liquid chamber common to the ram means;

said ram means each projecting at the proximal end through the plane of the receiving port to a point of adjacency to one another in, and free from contact with the interior of, the common liquid chamber in the hydraulic cylinder, said ram means when extended causing displacement of liquid from the cylinder, which combines the ram output for providing the input liquid flow against said side of the piston to displace same;

said ram means consisting of pairs of rams, and each pair consisting of a tubular ram and a comparatively small cross section rod ram disposed one within another, the tubular ram having a fixed stroke and the small rod ram having an adjustable stroke enabling trimming of their combined displacement to a fine degree of adjustment.

14. The invention of claim 12, the rams of each pair being provided with separate fluid-operated pistons, one connected to said one ram and the other connected to the countermoving companion ram, said fluid operated pistons having relatively adjacent positions from which they separate to activate the rams in response to the application of fluid pressure to the adjacent ends of the pistons, and having outer positions from which they move in a direction toward one another in response to the application of fluid pressure to the outer ends of the fluid operated pistons.

15. The invention of claim 13, said tubular ram being provided with a first fluid-operated piston connected thereto at the distal end and being in surrounding relation to the small ram, said small ram provided at its distal end with a more remote piston connected thereto and having one position of mutual adjaceny with respect to the first piston, said pistons separating to outer positions to activate the rams when subjected to fluid pressure on their adjacent ends, said pistons being reset to their mutually adjacent positions when subjected simultaneously to fluid pressure on their outer ends.

16. The invention of claim 15, and further comprising sequencing means connected for cyclically applying fluid pressure to the outer ends of the fluid operated pistons, said sequencing means including selector means for applying fluid pressure to the adjacent ends of the fluid-operated pistons of selected pairs of said rams thereby controlling the ram output of displaced liquid for each cycle.

References Cited by the Examiner
UNITED STATES PATENTS

| | | | |
|---|---|---|---|
| 2,417,256 | 3/1947 | Kremiller | 60—54.5 X |
| 2,597,050 | 5/1952 | Audemar | 60—54.5 |
| 2,927,432 | 3/1960 | Parry | 60—54.5 |

EDGAR W. GEOGHEGAN, *Primary Examiner*